Oct. 16, 1956  J. G. HODGENS, JR  2,766,767
CONTROLLED CENTRAL SUPPLY SYSTEM FOR WASHING SOLUTIONS
Filed April 20, 1953
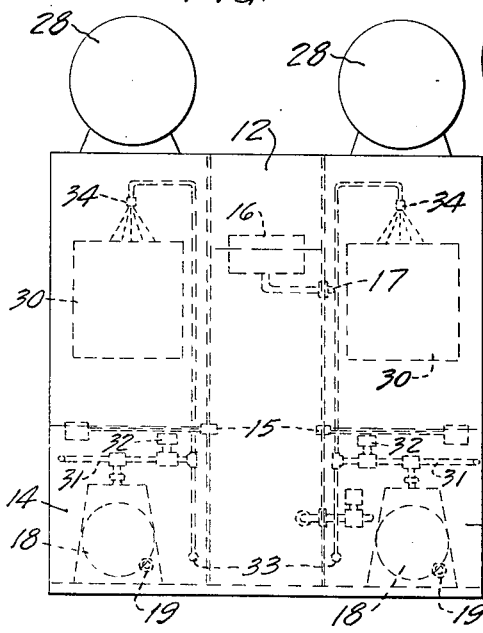
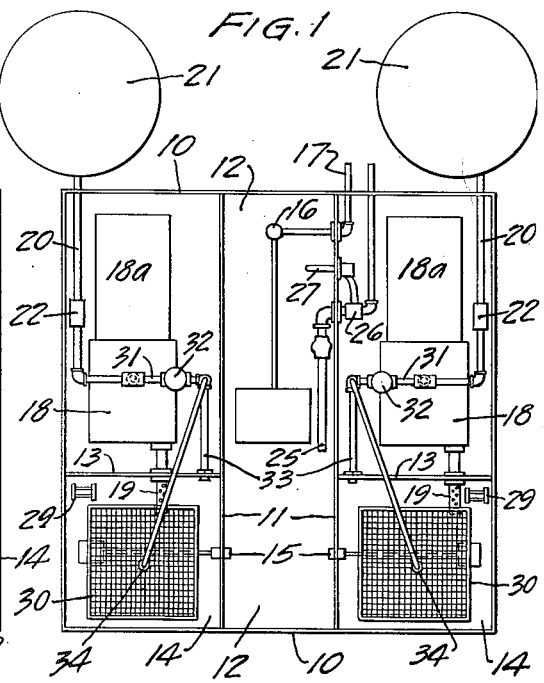
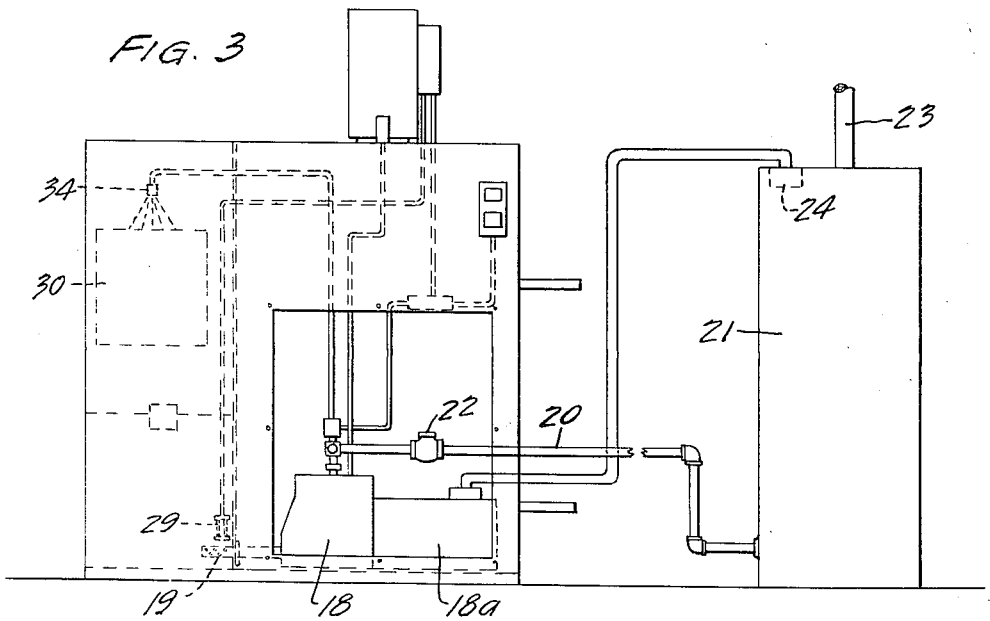
INVENTOR
JOHN G. HODGENS, JR.
BY Williamson Williamson Schroeder & Adams
ATTORNEYS

United States Patent Office 2,766,767
Patented Oct. 16, 1956

2,766,767

CONTROLLED CENTRAL SUPPLY SYSTEM FOR WASHING SOLUTIONS

John G. Hodgens, Jr., Chippewa Falls, Wis., assignor to The Diversey Corporation Application April 20, 1953, Serial No. 349,910

5 Claims. (Cl. 137—268)

This invention relates to a system for providing a source of washing solution supply under pressure to be distributed throughout an industrial plant, which solution is maintained at a substantially constant temperature and concentration.

It has been a serious problem in many industries, such as the dairy industry, to provide apparatus for quickly and thoroughly cleaning various plant equipment. This is particularly true in the dairy industry where extremely high standards of sanitation and cleanliness must be maintained at all times and all of the equipment used in processing dairy products must be periodically thoroughly cleaned with washing solution maintained at an optimum temperature and concentration.

It is an object of my invention to provide a novel and highly efficient centrally controlled system for supplying washing solution under pressure at a predetermined temperature and concentration to all required parts of an industrial plant.

More specificially, it is an object to provide central supply apparatus having automatically temperature and concentration controlled equipment adapted to maintain an adequate supply of washing solution under pressure at a predetermined temperature and concentration for distribution to various portions of an industrial plant.

Still more specifically, it is an object to provide an electronically controlled concentration maintaining device having a pair of concentrate mixing tanks individually controlled by electronic control units and supplied with hot water heated in a float controlled heating and storage tank disposed between said two mixing tanks and supplying heat as well as water to said tanks.

It is another specific object to provide a concentrate mixing tank having a washing powder basket disposed in spaced relation above the liquid level therein and receiving solution supplied from a pressure pump through a solenoid valve actuated by an electronic control unit responsive to the concentration in said concentrate mixing tank whereby a portion of the solution discharged from said pump is sprayed downwardly over the powder in said basket to increase the solution concentration when said concentration falls below a predetermined limit.

These and other objects and advantages of this invention will more fully appear from the following description made in connection with the accompanying drawings wherein like reference characters refer to the same or similar parts throughout the several views, and in which:

Fig. 1 is a top plan view of my solution concentration control apparatus;

Fig. 2 is a front elevational view thereof; and

Fig. 3 is a side elevational view thereof and showing a solution storage tank.

As illustrated in the accompanying drawings, I provide a suitable casing designated as an entirety by the numeral 10 and having a pair of partitions 11 extending thereacross to form a water heating and supply tank 12. Two divider partitions 13 with the adjacent portions of the casing partitions and sides respectively form a pair of concentration control tanks 14. The central water supply and heat tank 12 communicates with said concentration control tanks 14 through two passages respectively formed in partitions 11 and respectively controlled by a pair of float valves 15, as best shown in Figs. 1 and 2. As best shown in Fig. 2, the water supply level in tank 12 is maintained substantially higher than the solution level in tanks 14 and float valve 16 controls the flow of cold water supply under pressure through a suitable supply line 17.

A pair of solution pumps 18 respectively driven by electric motors 18a are provided behind each of the tanks 14 and have their inlet sides connected respectively with the bottom portions of each of said tanks through the screened intake tubes 19, best shown in Figs. 1 and 3. The discharge sides of said pumps 18 are connected by the respective conduits 20 to a pair of heated storage tanks 21, as best shown in Fig. 1. A check valve 22 is mounted in each of the conduits 20 to prevent backflow of solution therethrough and a supply line 23 is connected to the upper portion of each of the tanks 21 to deliver heated solution at a predetermined concentration to any desired location in a plant. Each of the storage tanks 21, in the form shown, is a thermostatically controlled hot water heater which is efficiently insulated and which maintains the solution therein at a predetermined temperature and under any desired pressure for supplying solution through the main supply line 23. A pressure switch 24 is mounted in each of the tanks 21 and is connected in series with the respective motor 18a for driving the respective pump 18. Thus, when the pressure in each of the heated storage tanks 21 falls below a predetermined limit, the pump 18 delivering to that particular storage tank is automatically started to provide additional solution from the respective tank 14 to which the same is connected.

Suitable means for providing quick recovery heat to the central water heating and supply tank 12 is provided, such as the solenoid controlled steam pipe 25 having a solenoid valve 26 therein which is actuated by the thermostatic switch 27 responsive for actuation to temperature changes in the liquid in heating and supply tank 12.

An electronic control unit 28 is provided for controlling the concentration in each of the solution supply tanks 14 and the circuit of each control unit 28 is similar to the circuit described and disclosed in my co-pending application, Serial No. 277,318, filed March 18, 1952, now abandoned, and said unit includes a pair of electrodes 29 which are submerged below the surface of the liquid in each of the tanks 14. In the form shown, these electrodes 29 are rigidly mounted in a pair of spaced supporting elements and extend therebetween. Said supporting elements are constructed of non-conductive material and extend outwardly a substantial distance beyond the sides of said electrodes to prevent said electrodes from coming in contact with the sides or bottom of the respective tanks 14 in which the same are positioned and obviate the necessity of any mounting bracket whatever within the solution tanks since said electrodes may be merely submerged in the tank and supported by the non-conductive supporting elements which may engage the tank bottom or sides without permitting the electrodes to come in contact therewith.

Each of the tanks 14 has a foraminous washing powder holder, such as the screen basket 30 mounted above the liquid level thereof and a supply line 31 is connected with the discharge line from each pump 18, and each supply line 31 has a solenoid 32 connected therein. Two branch conduits are connected with supply line 31, both under the control of valve 32, one of these branch conduits constituting an agitating discharge conduit 33 and the other constituting a spray discharge 34 disposed above each basket 30. When the concentration in one of the tanks 14 falls below a predetermined limit, the control unit 28 connected with the electrodes 29 submerged in said tank opens the solenoid valve 32 to permit a portion of the discharge from pump 18 to travel through the agitating conduit 33, the discharge of which is submerged below the solution surface in tank 14 and another portion through the spray nozzle 34 disposed above the basket 30 in said tank. As the water is sprayed into the basket and passes therethrough, the soluble washing powder contained in the basket of course is carried down into the solution to increase the concentration thereof and the agitating discharge flowing from line 33 quickly intermixes the strongly concentrated solution flowing down from the basket 30. As soon as the solution in said tank reaches the required concentration, the control unit connected therewith automatically shuts off the solenoid valve 32.

Since, by the very nature of this type of supply system, the entire apparatus is usually placed in any convenient location remote from the point of use and is not constantly attended as are dish washers and other similar apparatus, it is obviously desirable in such an installation to provide an alarm and automatic shut-off in the event that all of the washing powder in the basket 30 has been dissolved to stop the operation of the electronic unit. Such an alarm and shut-off switch may be provided which is responsive for actuation to the electronic control unit 28, causing continuous operation of the solution concentrating cycle for more than a predetermined time interval. Said shut-off switch of course stops the pump motor 18a and opens the circuit through the solenoid 32 as well as closing a circuit through an audible signal such as a buzzer alarm (not shown).

An important advantage in providing the individually controlled double solution supply system is that in many plants two different types of solutions might be desired and therefore separate systems would be required. Also, even though the same general type of solution might be used, different concentrations might be desirable, thus requiring two separate systems.

The following is a brief description of the operation of one of these systems. When the heated solution is drawn from one of the supply tanks 21, the pressure responsive switch 24 closes the circuit to the motor 18a to start pump 18 which draws additional solution through screened inlet 19 and discharges the same through conduit 20 and check valve 22 into the heated storage tank 21. When the solution is drawn from the tank 14, the liquid level therein drops and the float valve 15 introduces warm water into said tank. This of course reduces the concentration of the solution therein and, when said concentration falls below a predetermined limit, the control unit 28 opens solenoid 32 to cause a spray of solution under pressure from pump 18 into the basket 30 containing washing powder and simultaneously causes agitation of the solution within the tank 14 to quickly intermix the discharge flowing from the basket with the other solution and thereby increase the concentration thereof. When the solution in tank 14 reaches the required concentration, the electronic control unit 28 connected therewith will cause the valve 32 to be again closed. Obviously, when warm water is drawn from the heated supply tank 12 through the float valve 15, the liquid level in tank 12 will fall and float valve 16 will be opened to discharge cold water into said tank. This of course reduces the temperature of the water in said tank and the thermostatic switch 27 will open the steam supply solenoid valve 26 to permit live steam to be discharged through steam line 25 and quickly heat the water in tank 12 and thus maintain the same at a substantially uniform temperature.

It should be noted that, by supplying the solution from the concentrating tanks to a storage reservoir, a substantial volume of the solution being stored will be intermixed and thus a more uniform concentration of the supply solution will be obtained in the storage tank than could possibly be obtained from the concentrating tank since the concentration of the solution in the concentrating tank can only be maintained between certain prescribed limits, but, by intermixing all of the solution before supplying the same under pressure, an average concentration will obviously be obtained which will be extremely uniform.

It will be seen that I have provided a relatively simple, yet highly efficient, central system for supplying washing solution at a predetermined pressure temperature and concentration temperature and pressure to any desired location throughout a plant and thus permit a number of supply stations to be provided around the plant for convenient attachment of washing equipment thereto.

It will, of course, be understood that various changes may be made in the form, details, arrangement and proportions of the parts without departing from the scope of this invention, which, generally stated, consists in the matter shown and described herein and set forth in the appended claims.

What I claim is:

1. In a system for supplying a solution of solid soluble material having a controlled concentration to a remotely disposed location: a liquid solvent supply tank; a concentration control tank; supply means connecting said supply tank with said concentration control tank for permitting solvent material to flow from the supply tank to the concentration control tank; a solution storage tank for maintaining the solution at a predetermined supply head having an opening through which solution in said tank may be removed therefrom and transmitted to a remotely disposed location whereby said removal causes the system to be actuated; supply means connecting said solution storage tank with said concentration control tank causing solution to flow from said concentration control tank to said solution storage tank under pressure; means operatively connected to said storage tank which is responsive to a predetermined volume characteristic of solution stored in said storage tank and which automatically actuates the flow of solution from the concentration control tank into said storage tank under pressure, through said supply means that connects said storage tank with said concentration control tank, when solution is removed from said storage tank to a remotely disposed location; control means operatively connected to said concentration control tank which is responsive to a predetermined volume characteristic of solution in said concentration control tank and automatically causes liquid solvent from the supply tank to flow through said supply means that connects the supply tank to the concentration control tank; a recycling circuit comprising container means which retains undissolved soluble solid material and supply means connecting the concentration control tank to said container means, said container means being positioned in relationship to said concentration control tank so that solution from the concentration control tank may be fed to said container means and fed to the concentration control tank in seriatim; said recycling circuit being operatively responsive to concentration control means which is operatively connected to said concentration control tank, said concentration control means being responsive to the concentration of solution in said concentration control tank and being capable of causing the concentration of solution in said concentration control tank to be increased and maintained at a predeterminable level of concentration by causing actuation and control of the recycling circuit.

2. The system set forth in claim 1 wherein said concentration control means increases and maintains the concentration of solution in the concentration control tank at a predeterminable level of concentration, which comprises: a pair of electrodes positioned in said concentration control tank; and electronic control means operatively connected to said electrodes for causing the supply of concentrated solution to the concentration control tank whenever the concentration therein falls below a predetermined level of concentration, said electronic control means restricting the supply of concentrated solution to the concentration control tank whenever the concentration of solution in the concentration control tank reaches a predetermined level of concentration.

3. In a system for supplying a solution of solid soluble material having a controlled concentration to a remotely disposed location: a liquid solvent supply tank; a concentration control tank; supply means connecting said supply tank with said concentration control tank for permitting solvent material to flow from the supply tank to the concentration control tank; a solution storage tank for maintaining the solution at a predetermined supply head having an opening through which solution in said tank may be removed therefrom and transmitted to a remotely disposed location whereby said removal causes the system to be actuated; supply means connecting said solution storage tank with said concentration control tank causing solution to flow from said concentration control tank to said solution storage tank under pressure; means operatively connected to said storage tank which is responsive to a predetermined volume characteristic of solution stored in said storage tank and which automatically actuates the flow of solution from the concentration control tank into said storage tank under pressure, through said supply means that connects said storage tank with said concentration control tank, when solution is removed from said storage tank to a remotely disposed location; control means operatively connected to said concentration control tank which is responsive to a predetermined volume characteristic of solution in said concentration control tank and automatically causes liquid solvent from the supply tank to flow through said supply means that connects the supply tank to the concentration control tank; container means which retains material of a higher concentration than the solution in the concentration control tank and supply means connecting the concentration control tank to said container means, said container means being positioned in relationship to the concentration control tank so that the more concentrated material from the container means will be selectively fed to the concentration control tank, the flow of material from the container means to the concentration control tank being operatively responsive to concentration control means which is operatively connected to said concentration control tank, said concentration control means being capable of causing the concentration of solution in said concentration control tank to be increased and maintained at a predeterminable concentration.

4. In a system for supplying a solution of solid soluble material having a controlled concentration to a remotely disposed location: a liquid solvent supply tank; a concentration control tank; supply means connecting said supply tank with said concentration control tank for permitting solvent material to flow from the supply tank to the concentration control tank; a solution storage tank for maintaining the solution at a predetermined supply head having an opening through which solution in said tank may be removed therefrom and transmitted to a remotely disposed location whereby said removal causes the system to be actuated; supply means connecting said solution storage tank with said concentration control tank causing solution to flow from said concentration control tank to said solution storage tank under pressure; means operatively connected to said storage tank which is responsive to a predetermined volume characteristic of solution stored in said storage tank and which automatically actuates the flow of solution from the concentration control tank into said storage tank under pressure, through said supply means that connects said storage tank with said concentration control tank, when solution is removed from said storage tank to a remotely disposed location; control means operatively connected to said concentration control tank which is responsive to a predetermined volume characteristic of solution in said concentration control tank and automatically causes liquid solvent from the supply tank to flow through said supply means that connects the supply tank to the concentration control tank; concentration control means operatively connected to said concentration control tank, said concentration control means being responsive to the concentration of solution in said concentration control tank and being capable of causing the concentration of solution in said concentration control tank to be increased and maintained at a predeterminable level of concentration.

5. The system set forth in claim 4 wherein said concentration control means increases and maintains the concentration of solution in the concentration control tank at a predeterminable level of concentration, which comprises: a pair of electrodes positioned in said concentration control tank; and electronic control means operatively connected to said electrodes for causing the supply of concentrated solution to the concentration control tank whenever the concentration therein falls below a predetermined level of concentration, said electronic control means restricting the supply of concentrated solution to the concentration control tank whenever the concentration of solution in the concentration control tank reaches a predetermined level of concentration.

References Cited in the file of this patent

UNITED STATES PATENTS

| 1,576,001 | Olden | Mar. 9, 1926 |
| 2,377,363 | Noble | June 5, 1945 |
| 2,514,630 | Downing | July 11, 1950 |
| 2,630,819 | Norcross | Mar. 10, 1953 |